United States Patent [19]

Watson et al.

[11] Patent Number: 5,317,688

[45] Date of Patent: May 31, 1994

[54] SOFTWARE AGENT USED TO PROVIDE INSTRUCTION TO A USER FOR A PLURALITY OF COMPUTER APPLICATIONS

[75] Inventors: Ralph T. Watson, San Jose; Barbara B. Packard, Los Altos Hills; Glenn Stearns, Scotts Valley, all of Calif.

[73] Assignee: Hewlett-Packard Company, Palo Alto, Calif.

[21] Appl. No.: 23,758

[22] Filed: Feb. 26, 1993

Related U.S. Application Data

[63] Continuation of Ser. No. 674,439, Mar. 22, 1991, abandoned, which is a continuation of Ser. No. 225,115, Jul. 26, 1988, abandoned.

[51] Int. Cl.$^5$ .............................................. G06F 15/64
[52] U.S. Cl. ..................................... 395/161; 395/155
[58] Field of Search ... 364/200 MS File, 900 MS File; 340/706; 395/155, 156, 161

[56] References Cited

U.S. PATENT DOCUMENTS

| 4,190,835 | 2/1980 | Buynak | 340/750 |
| 4,558,413 | 12/1985 | Schmidt et al. | 364/300 |
| 4,742,467 | 5/1988 | Messerich et al. | 364/200 |
| 4,809,170 | 2/1989 | Leblang et al. | 364/200 |
| 4,811,240 | 3/1989 | Ballou et al. | 364/518 |
| 4,866,638 | 9/1989 | Cosentino et al. | 364/521 |
| 5,041,992 | 8/1991 | Cunningham et al. | 364/518 |

FOREIGN PATENT DOCUMENTS

0236744 9/1987 European Pat. Off. .

OTHER PUBLICATIONS

J. L. Bennett, "Tools for Building Advanced User Interfaces", IBM Systems Journal, vol. 25, No. 3-4, part 1, 1986, pp. 354-368.

R. Edmonds et al.: "The Synics2 User Interfade Manager", Interact '84/B S. Shackel (Ed)-Human Computer Interaction, 1985, pp. 375-378.

G. R. Gallaway et al.: "Embedded Training in Computer Based Information Systems Software", IEEE 1986 National Aerospace and Electronics Conference NAECON 1986, Dayton, May 19-23, 1986, vol. 3, pp. 846-850.

W. Buxton et al. "Towards a Comprehensive User Interface Management System", Computer Graphics, vol. 17, No. 3, 1983, pp. 35-42.

Primary Examiner—Phu K. Nguyen

[57] ABSTRACT

A computing system includes an application object, a computer based training instruction object ("INSTRUCTION object") and an agent engine. The INSTRUCTION object runs concurrently with the application object. The application objects includes a first action processor and a first command processor. The first action processor receives messages which indicate syntactic actions taken by the user and generates semantic commands based on the syntactic actions. The first command processor receives the semantic commands from the first action processor and executes the semantic commands. The INSTRUCTION object receives input from a user through syntactic actions and displays information on a monitor. The information instructs a user as to operation of the first application. The INSTRUCTION object may include an INSTRUCTION action processor and an INSTRUCTION command processor. The INSTRUCTION action processor receives messages which indicate syntactic actions taken by the user and generates semantic commands based on the syntactic actions. The INSTRUCTION command processor receives the semantic commands from the INSTRUCTION action processor and executes the semantic commands. The agent, running a task language program, sends semantic commands to the INSTRUCTION object which direct the INSTRUCTION object as to what information to display. The agent also monitors the application object and the INSTRUCTION object, intercepting semantic commands before they are executed.

10 Claims, 18 Drawing Sheets

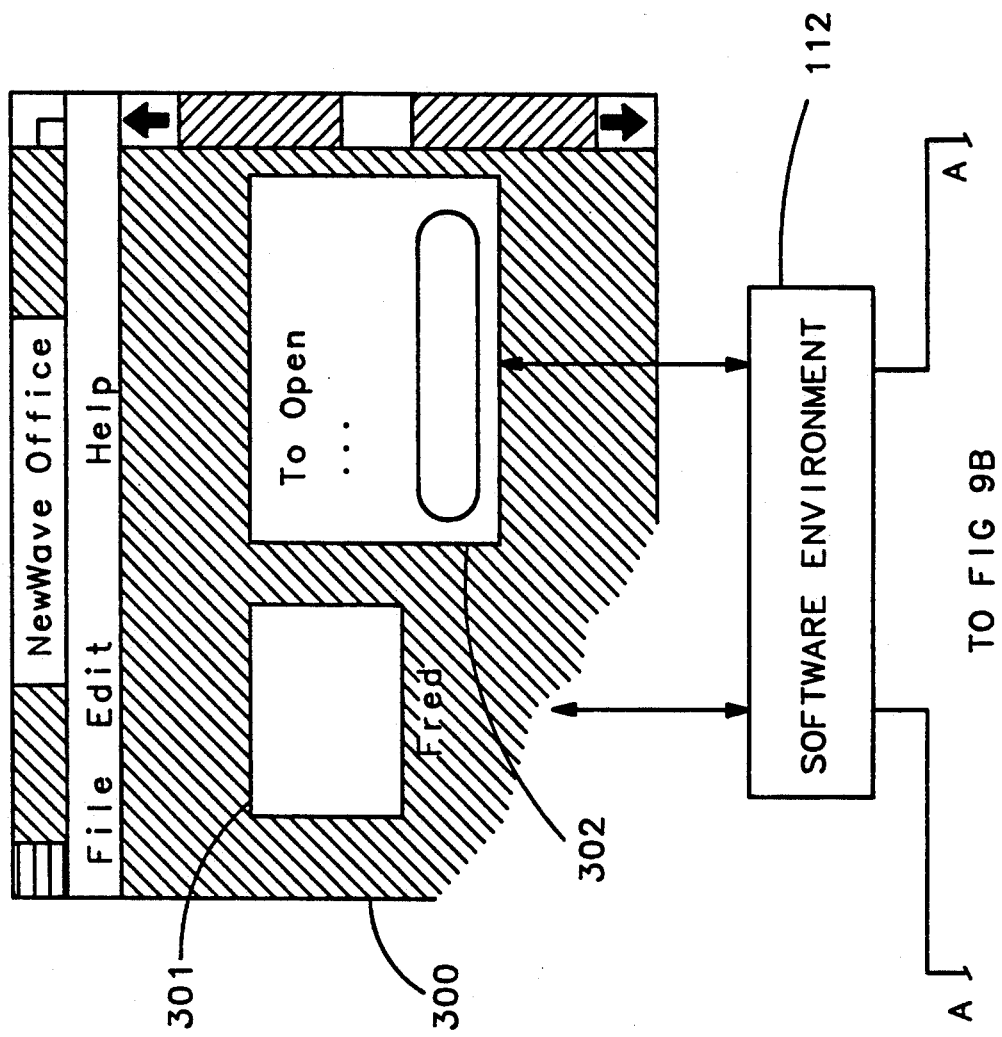

5,317,688

SOFTWARE AGENT USED TO PROVIDE INSTRUCTION TO A USER FOR A PLURALITY OF COMPUTER APPLICATIONS

This application is a continuation of copending application Ser. No. 07/674,439, filed Mar. 22, 1991, now abandoned. Application Ser. No. 07/674,439, filed Mar. 22, 1991 was a continuation of application Ser. No. 07/225,115, filed Jul. 26, 1988, now abandoned.

BACKGROUND

The present invention relates to computer-based training (CBT) and particularly to the use of a software agent to provide instruction to a user.

CBT is provided with many commercially available applications to either complement or replace manuals, written tutorials and other traditional instruction materials. CBT can be interactive and often models the role of a human mentor, providing specific feedback in response to a user's performance during a training session.

Generally there are two ways CBT is implemented. In "Simulated CBT" the application is simulated by a CBT program. In "Concurrent CBT" the application is run concurrently with a CBT program.

As applications become more sophisticated and make greater utilizations of graphics, it is more difficult to use simulated CBT. This is because complexity in an application generally requires complexity in a program which simulates the application.

Concurrent CBT may often be much less complex than simulated CBT because in concurrent CBT the application itself provides its own interface and functionality during a training session. In a concurrent CBT session, a CBT program generally will initiate the application and act as a "shell" around the application.

During the concurrent CBT session, the CBT will open the application and control it to bring the application to a known, desired state. Using its own routines CBT will deliver instructional text and graphics to a user through "windows" which are drawn on top of the application. The text and graphics explain the application concepts and prompt for user response. The CBT monitors user input to determine whether the user has responded appropriately, and monitors the display screen to determine when the application has finished processing input. Then the CBT can advance the training based on the user's response.

Typically, the CBT controls and monitors the activities of an application at a syntactic level. What is meant herein by "syntactic level" is the action a user makes, such as keystrokes or movements of a mouse, in order to interact with an application. For example, in a CBT acting at a syntactic level where an application is controlled with a keyboard and mouse and where it outputs to a CRT monitoring device, the CBT would be able to detect detect key and mouse input, as well as the status of pixels on the CRT. This level of interaction is referred to as "syntactic" because at this level the computer does not semantically interpret the intent associated with the actions.

SUMMARY OF THE INVENTION

In accordance with the preferred embodiments of the present invention a computing system is presented which includes an application object, a computer based training instruction object ("INSTRUCTION object") and an agent engine. The INSTRUCTION object runs concurrently with the application object. The application objects includes a first action processor and a first command processor. The first action processor receives messages which indicate syntactic actions taken by the user and generates semantic commands based on the syntactic actions. The first command processor receives the semantic commands from the first action processor and executes the semantic commands.

The INSTRUCTION object receives input from a user through syntactic actions and displays information on a monitor. The information instructs a user as to operation of the first application. The INSTRUCTION object, in the preferred embodiment, includes a INSTRUCTION action processor and a INSTRUCTION command processor. The INSTRUCTION action processor receives messages which indicate syntactic actions taken by the user and generates semantic commands based on the syntactic actions. The INSTRUCTION command processor receives the semantic commands from the INSTRUCTION action processor and executes the semantic commands.

The agent, running a task language program, sends semantic commands to the INSTRUCTION object which direct the INSTRUCTION object as to what information to display. The agent also monitors the application object and the INSTRUCTION object, intercepting semantic commands before they are executed.

BRIEF DESCRIPTION OF THE DRAWINGS

FIGS. 9 and 9A-9B are the block diagrams which show the addition of a application which performs computer based training to the application and agent environment shown in FIG. 1.

DESCRIPTION OF THE PREFERRED EMBODIMENT

Figure 1:
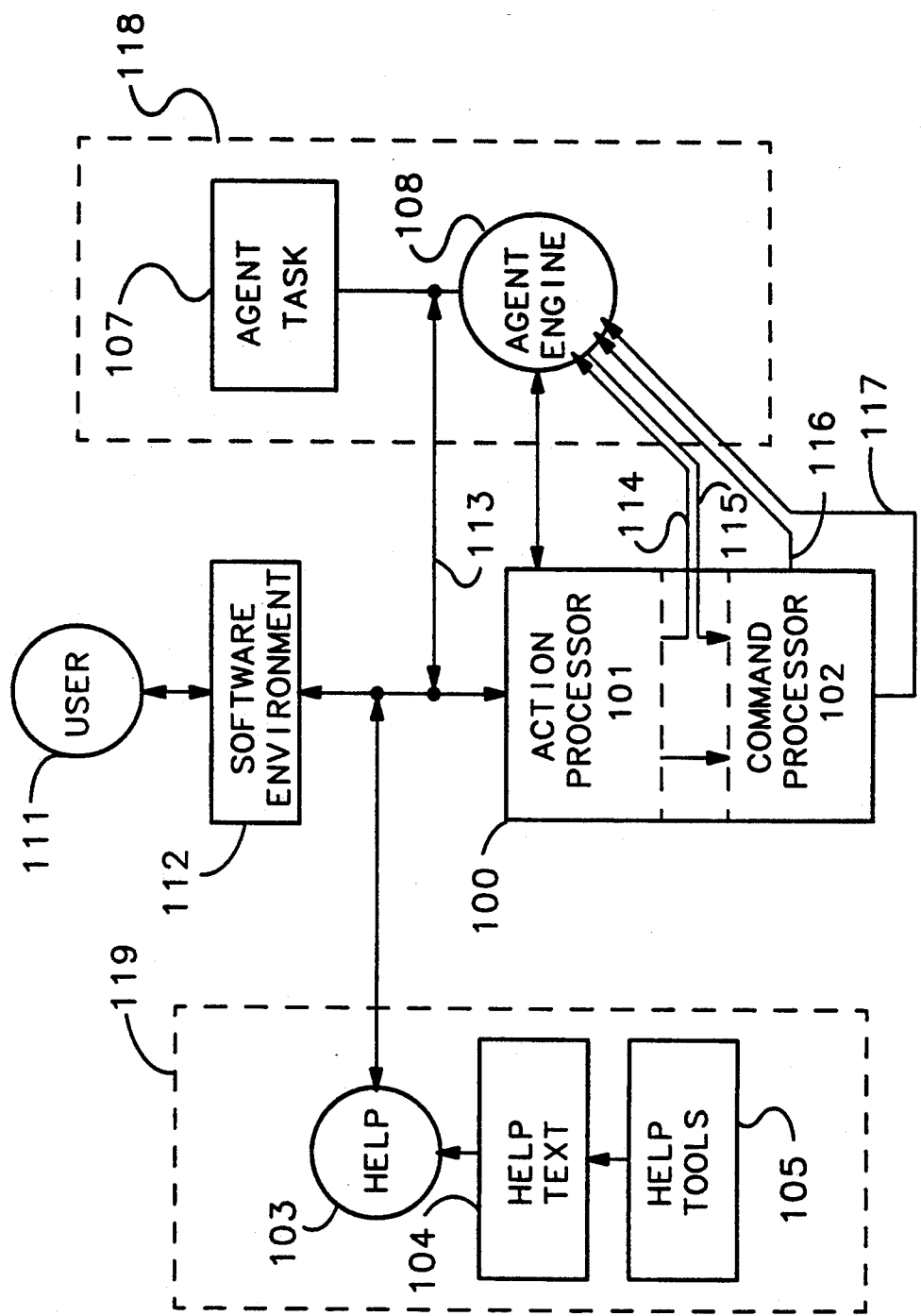
FIG. 1 is a block diagram which shows the interaction between an application, an agent environment and a help environment.

FIG. 1 is a block diagram of a computing system in accordance with a preferred embodiment of the present invention. A user 111 communicates with the computing system through a software environment 112. Software environment 112 may be, for instance, Microsoft Windows, a program sold by Microsoft Corporation, having a business address at 16011 NE 36th Way, Redmond, Wash. 98073-9717. Software environment 112 interacts with an application 100. Messages containing information describing user actions are sent to application 100 by software environment 112. In the preferred embodiment the messages containing user actions are standard messages sent by Microsoft Windows. Application 100 includes an action processor 101 which converts syntactic user actions to a single semantic command. For example, action processor 101 observes and collects user actions, e.g., the clicks and movements of a mouse used by a user. Once the user actions conform to the syntax of a command, a semantic command is generated. There are multiple ways user actions may be used to generate a single semantic command. The ways the semantic command is generated by a user may differ, but the execution of the semantic command is always the same. Action processor 101 is able to syntactically interpret the many ways a user can build a particular semantic command. In addition to syntactic user actions, action processor 101 also processes other messages from which come to application 100. Some messages will result in a semantic command being generated; others will be dealt with entirely by action processor 101.

Application 100 also includes a command processor 102 which executes semantic commands. Command processor 102 receives semantic commands in internal form (internal form is discussed more fully below) and returns an error if a command cannot be executed.

Application 100 and software environment 112 interact with help environment 119 at the level of the interface between software environment 112 and application 100. Help environment 119 includes a help application 103, which utilizes a help text 104. Help environment 119 also includes help tools 105 which are used to generate help text 104.

Software environment 112 also interacts with an agent environment 118. Agent environment 118 includes an agent task 107 and an agent engine 108.

Agent engine 108 interacts with application 100 at five different conceptual categories, in order to perform five functions. Agent engine 108 interacts with action processor 101 through a data channel 113 for the purpose of interrogation. Agent engine 108 interacts between action processor 101 and command processor 102 through a data channel 114 for the purpose of monitoring the activities of application 100. Agent engine 108 interacts with command processor 102 through a data channel 115 for the purpose of having commands executed by application 100. Agent engine 108 interacts with command processor 102 through a data channel 116 for the purpose of handling errors in the processing of a command within application 100. Agent engine 108 interacts with command processor 102 through a data channel 117 for the purpose of recording execution of application 100 and receiving notification of the completion of a command.

In the preferred embodiment of the present invention, commands may be represented in four ways, (1) in task language form, stored as keywords and parameters, (2) in pcode form, which are binary codes in external form with additional header interpreted by agent engine 108; (3) in external form, which are binary data understood by application 100 and which are passed between agent engine 108 and application 100; and (4) in internal form, as binary commands which are executed within application 100. The four ways of representing commands are further described in Appendix A attached hereto.

Figure 2:
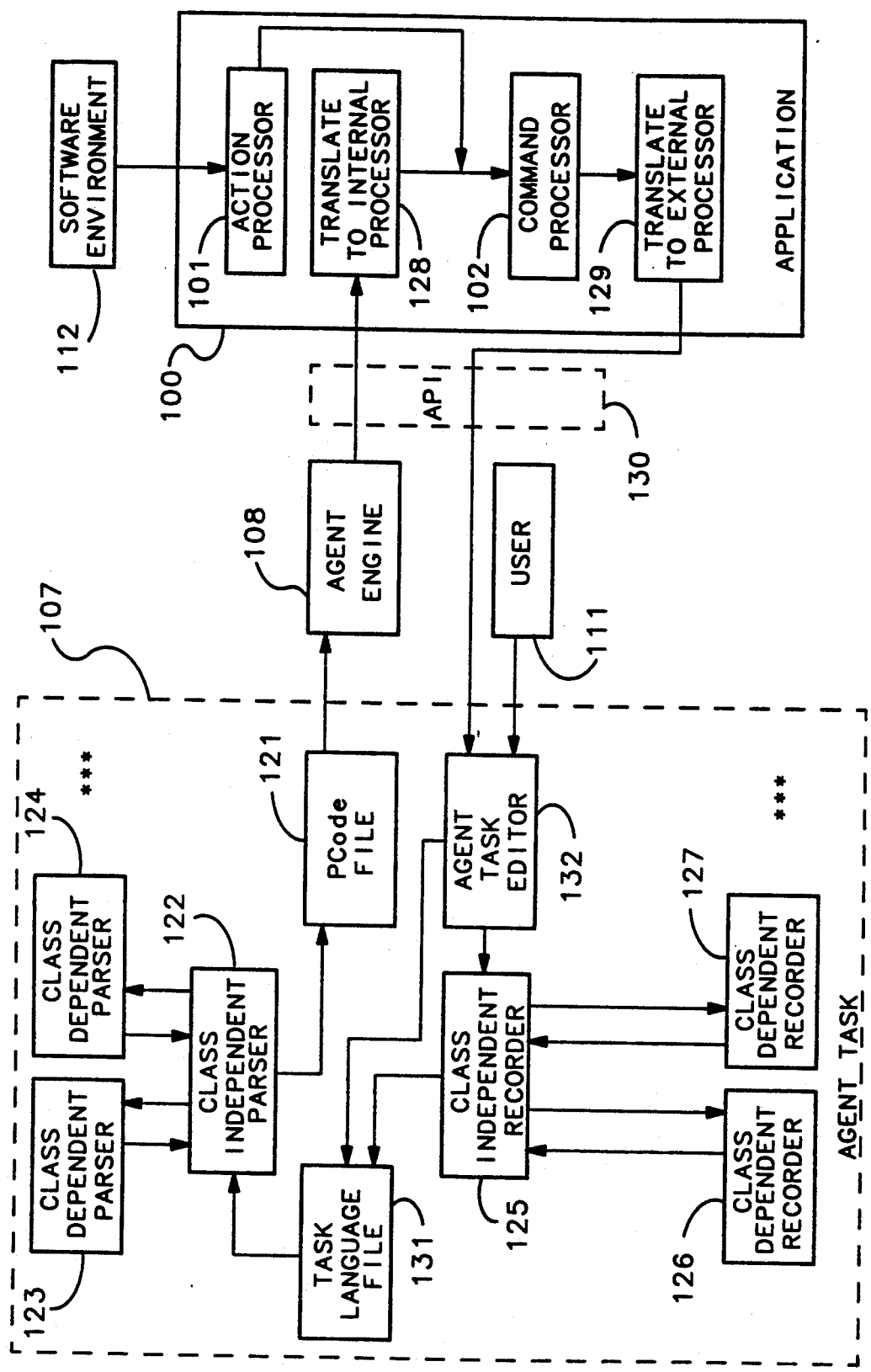
FIG. 2 is a block diagram which shows how a task language file is generated and executed in accordance with the preferred embodiment of the present invention.

FIG. 2 shows a block diagram of how the overall agent system functions. A task language file 131 is a file containing task language. Task language is the text form of commands that describe an application's functionality. Task language is comprised of class dependent commands and class independent commands. Class dependent commands are commands which are to be performed by an application. In FIG. 2, just one application, application 100 is shown; however, agent engine 108 may interact with many applications.

In the preferred embodiment of the present invention, data files to be operated on by applications are referenced by the use of objects. Each object contains a reference to a data file and a reference to an application. Those objects which refer to the same application are said to be members of the same class. Each application executes a different set of commands. Class dependent commands therefore differ from application to application.

Agent engine 108 executes class independent commands which are commands understood by agent engine 108. Class independent commands are executed by agent engine 108, not by an application.

Task language file 131 is used by a class independent parser 122 to prepare a pcode file 121. In preparing pcode file 121, independent parser 122 calls class dependent parsers 123, 124 and etc. As will be further described below, a class dependent parser is a parser which generates class dependent commands which are encapsulated in pcode form. Agent engine 108 extracts the commands in their external form from the pcode form and forwards these commands to the appropriate application. A class field within the pcode indicates which application is to receive a particular class dependent command. Class independent parser 122 is a parser which generates pcodes which are executed by agent engine 108.

Task language file 131 may be prepared by user 111 with an agent task editor 132. Alternately, task language file may be prepared by use of a class independent recorder 125 which utilizes class dependent recorders 126, 127 and etc. Generally, a recorder records the commands of applications for later playback. When the computing system is in record mode, agent task editor 132 receives input from applications, such as shown application 100, which detail what actions agent engine 108 and the applications take. Applications communicate to agent task editor 132 through an application program interface (API) 130. Agent task editor 132, forwards data to class independent recorder 125 when the computing system is in record mode, and to task language file 131 when agent task editor is being used by user 111.

Class independent recorder 125 receives the information and builds task language file 131. When class independent recorder 125 detects that agent task editor 132 is forwarding information about an action taken by an application, class independent recorder calls the class dependent recorder for that application, which then generates the task language form for that action. Class independent recorder 125 generates the task language form for actions taken by agent engine 108.

When executing pcode file 121, agent engine 108 reads each pcode command and determines whether the pcode command contains a class independent command to be executed by agent engine 108, or a class dependent command to be executed an application. If the pcode command contains a class independent command, agent engine 108 executes the command. If the pcode command contains a class dependent command, agent engine 108 determines by the pcode command the application which is to receive the command. Agent engine 108 then extracts a class dependent command in external form, embedded within the pcode. This class dependent command is then sent to the application. For instance, if the class dependent command is for application 100, the class dependent command is sent to application 100. Within application 100 a translate to internal processor 128 is used to translate the class dependent command—sent in external form—to the command's internal form.

In the interactions between agent engine 108 and application 100, API 130 is used. API 130 is a set of functions and messages for accessing agent engine 108 and other facilities.

Figure 3:
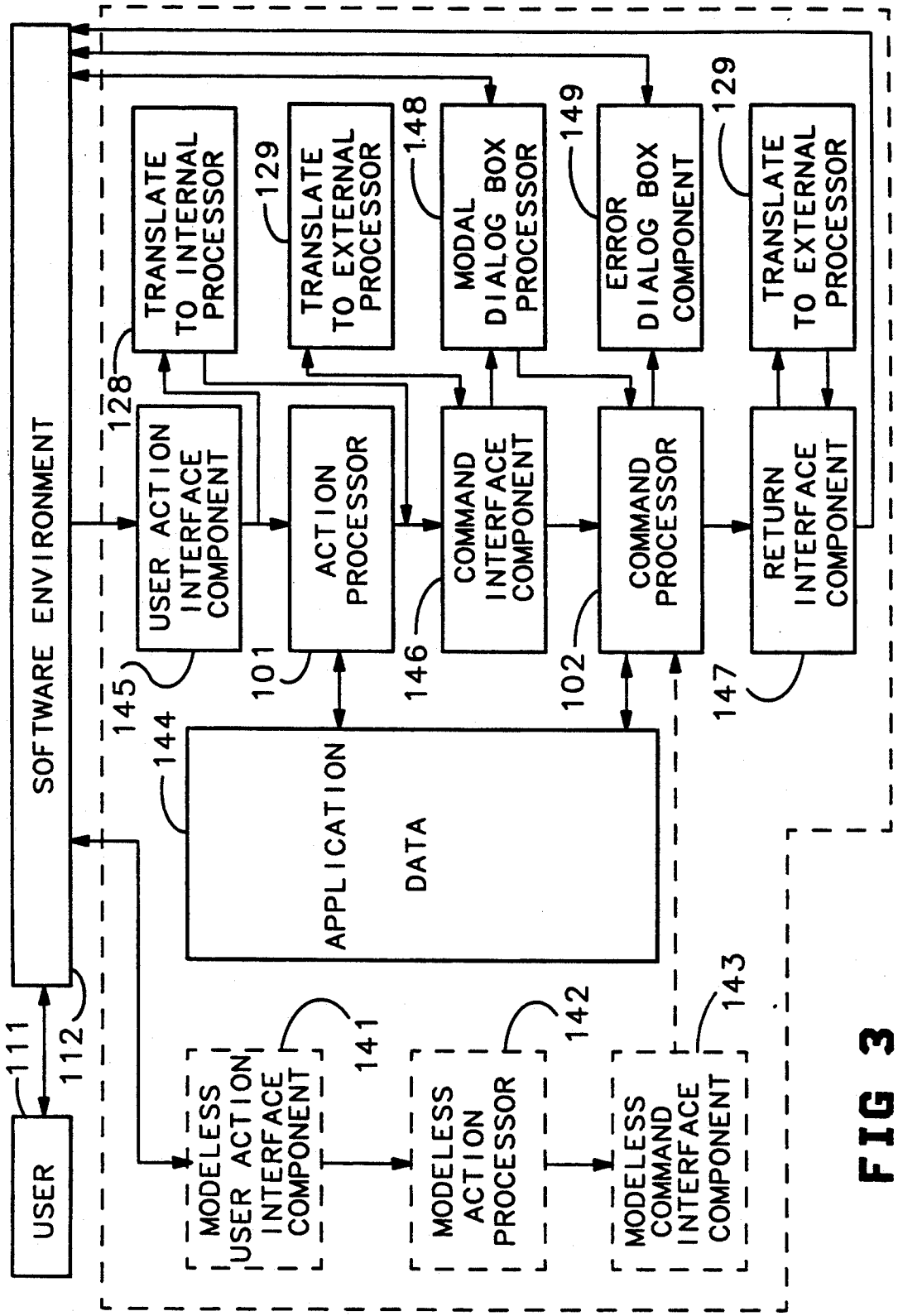
FIG. 3 is a block diagram of the application shown in FIG. 1 in accordance with a preferred embodiment of the present invention.

When the system is in record mode, translate to internal processor 128 translates commands from agent engine 108 and feeds them to command processor 102 through a command interface component 146 shown in FIG. 3. A translate to external processor 129 receives commands in internal form that have been executed by command processor 102. The commands are received through return interface component 147, shown in FIG. 3. Translate to external processor 129 translates the commands in internal form to commands in external form. The commands in external form are then transferred through API 130 to task editor 132.

FIG. 3 shows in more detail the architecture of application 100 in the preferred embodiment of the present invention. Application 100 includes a user action interface component 145 which interacts with software environment 112 and command interface component 146 which communicates with both action processor 101 and command processor 102. As shown both action processor 101 and command processor 102 access application data 144. A return interface component 147 is responsive to command processor 102 and returns control back to software environment 112. Translate to external processor 129 is shown to interact with return interface component 147. Return interface component 147 is only called when application 100 is in playback mode or record mode. These modes are more fully described below. Return interface component 147 indicates to agent engine 108 that a command has been executed by application 100 and application 100 is ready for the next command.

Also included in application 100 are a modal dialog box processor 148 and an error dialog box component 149. Both these interact with software environment 112 to control the display of dialog boxes which communicate with a user 111.

Some applications are able to operate in more than one window at a time. When this is done a modeless user action interface component, a modeless action processor, and a modeless command interface component is added for each window more than one, in which an application operates. For example, in application 100 is shown a modeless user action interface component 141, a modeless action processor 142 and a modeless command interface component 143.

Figure 4:
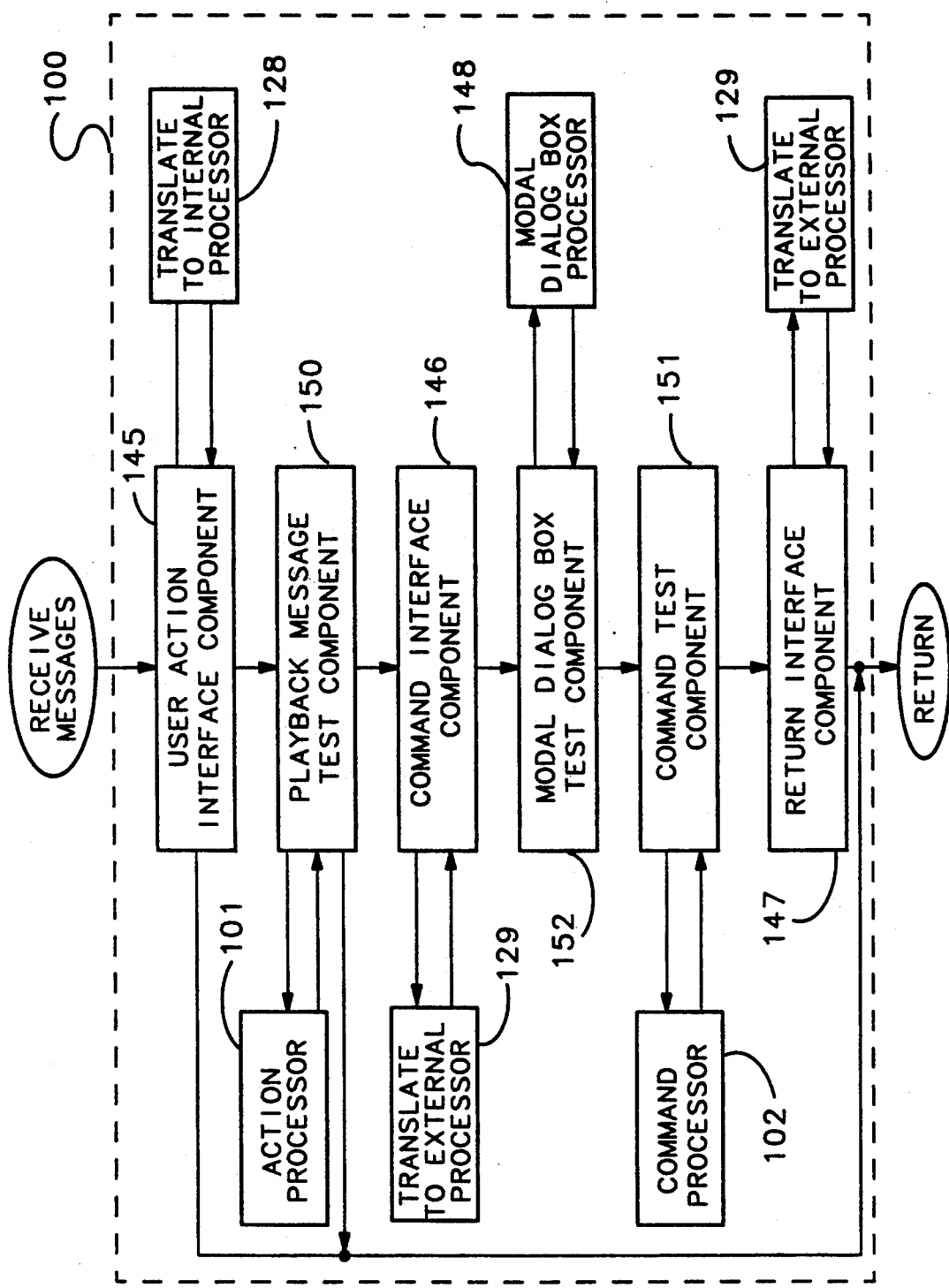
FIG. 4 is a block diagram showing data flow through the application shown in FIG. 1 in accordance with a preferred embodiment of the present invention.

FIG. 4 shows data flow within application 100. Messages to application 100 are received by user action interface component 145. For certain types of messages—e.g., messages from help application 103—user action interface 145 causes application 100 to return immediately. Otherwise the message is forwarded to a playback message test component 150.

If the message is for playback of commands which have been produced either by recording or parsing, the message is sent to translate to internal processor 128 which translates a command within the message from external form to internal form. The command is then forwarded to command interface component 146.

If the message is not a playback message the message is sent to action processor 101 to, for example, syntactically interpret a user's action which caused the generation of the message. If there is no semantic command generated by action processor 101, or produced by internal processor 128 playback message test component 150 causes application 100 to return. If there is a semantic command generated the command is forwarded to command interface component 146.

If agent engine 108 is monitoring execution of commands by application 100, command interface component 146 sends any data received to translate to external processor 129 which translates commands to external form and transfers the commands to agent engine 108. Command interface component also forwards data to a modal dialog box test component 152.

If the forwarded data contains a request for a dialog box, modal dialog box test component 152 sends the data to modal dialog box processor 148 for processing. Otherwise modal dialog box test component 152 sends the data to command test component 151.

If the data contains a command, command test component 151 sends the command to command processor 102 for execution. Command test component 151 sends the data to return interface component 147.

If agent engine 108 is recording commands, return interface component 147 sends the data to translate to external processor 129 for translation to external form and transfer to agent engine 108 via return interface component 147. Return interface component returns until the next message is received.

Figure 5:
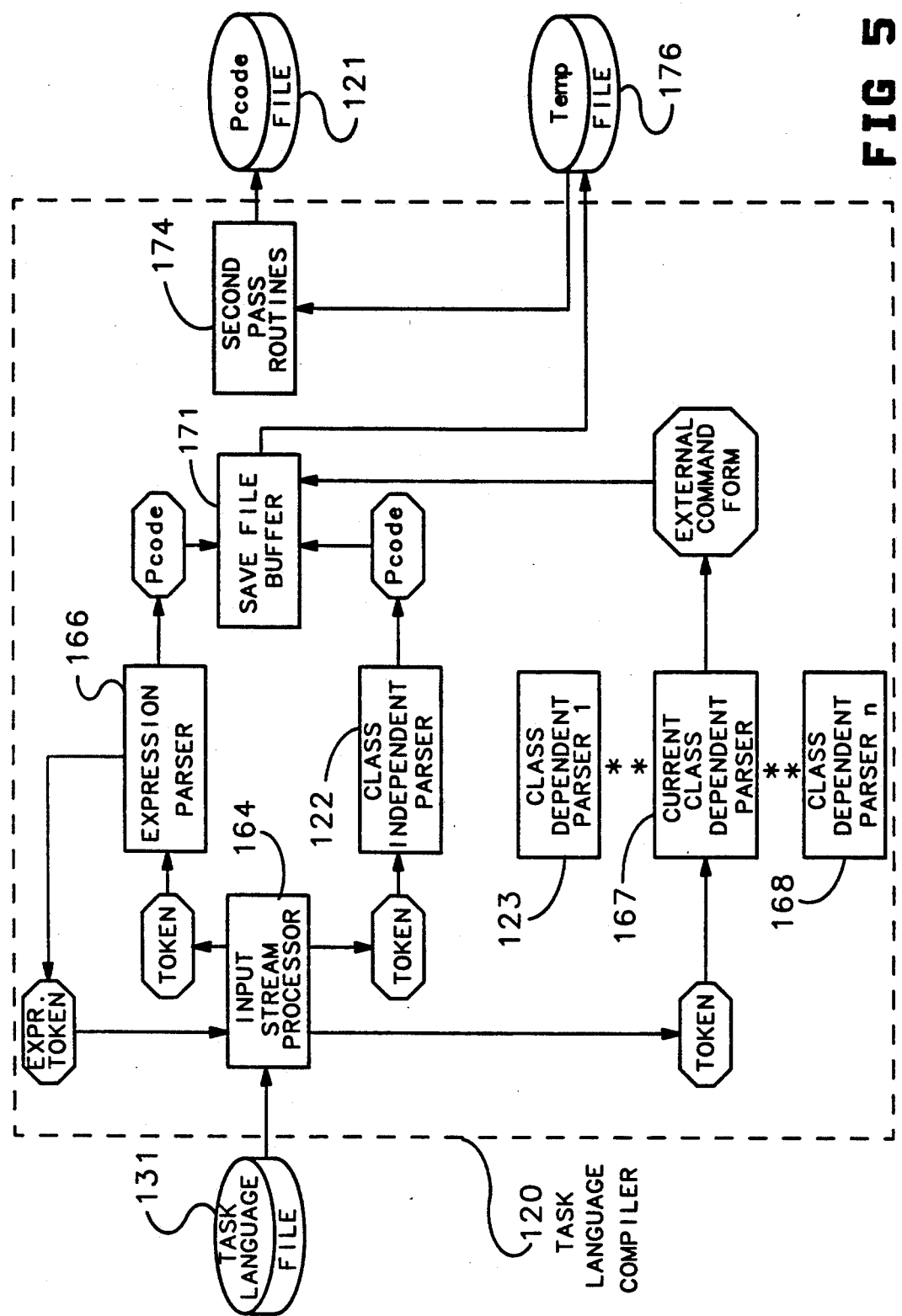
FIG. 5 is a diagram of a compiler in accordance with a preferred embodiment of the present invention.

In FIG. 5, data flow through a task language compiler 120 is shown. Task language compiler 121 is used to generate Pcode file 121 task language written by a user. A task language file 131 includes commands written by a user. In the preferred embodiment of the present invention, the task language is written in accordance with the Agent Task Language Guidelines included as Appendix B to this Specification.

Task language compiler 120 is a two pass compiler. In the first pass the routines used include an input stream processor 164, an expression parser 166, a class independent parser 122, a save file buffer 171, second pass routines 174, and class dependent parsers, of which are shown class dependent parser 123, a class dependent parser 167 and a class dependent parser 168. As a result of the first pass a temporary file 176 is created.

Class independent parser 122 parses the class independent task language commands. Each application which runs on the system also has special commands which it executes. For each application, therefore, a separate class dependent parser is developed. This parser is able to parse commands to be executed by the application for which it is developed. Class dependent parsers may be added to or deleted from task language compiler 120 as applications are added to or deleted from the system.

In addition a CBT parser 125 is shown. CBT parser 125 is used to parse code generated to be run by agent engine 108 when performing CBT.

When compiling begins, class independent parser 122 requests a token from input stream processor 164. Input stream processor 164 scans task language file 131 and produces the token. Class independent parser 122 then does one of several things. Class independent parser 122 may generate pcode to be sent to save file buffer 171. If class independent parser 122 expects the next token to be an expression, class independent parser 122 will call routine MakeExpression ( ) which calls expression parser 166. Expressions parser 166 requests tokens from input stream processor 164 until the expression is complete. Expression parser 166 then generates pcode to be sent to file buffer 171 and then to be saved in temporary file 176. Additionally, expression parser 166 generates an expression token which is returned to input stream processor 164. Input stream processor 164 delivers this expression to independent parser 122 when it is requested by independent parser 122.

As a result of a FOCUS command, a particular class dependent parser will have priority. Therefore, in its parsing loop, class independent scanner 122a will call the class dependent parser for the application which currently has the focus. The class dependent parser will request tokens from input stream processor 164 until it has received a class dependent command which the semantic routines called by class dependent parser convert to external command form, or until the class dependent parser determines that it cannot parse the expressions that it has received. If the class dependent parser encounters an expression, it may invoke expression parser 166 using the call MakeExpression (). If the class dependent parser is unable to parse the tokens it receives, the class dependent parser returns an error and the class independent parser will attempt to parse the tokens.

A FOCUS OFF command will result in independent parser 122 immediately parsing all commands without sending them to a dependent parser. When a string of class independent commands are being parsed, this can avoid the needless running of dependent parser software, thus saving computing time required to compile the task language.

CBT compiler directives result in a CBT compiler flag being "on" or "off". The CBT compiler flag determines whether CBT parser 125 is available to be called to parse commands. Precedence for parsing is as described below.

Commands will first be sent to any class dependent parser which has focus. If there is no class dependent parser with focus, or if the class dependent parser with focus is unable to parse the command, the command will then be sent to CBT parser 125 for parsing if the CBT compiler flag is "on". If the CBT compiler flag is "off" or if the CBT parser 125 is unable to parse the command, the command will be parsed by class independent parser 122.

Figure 7:
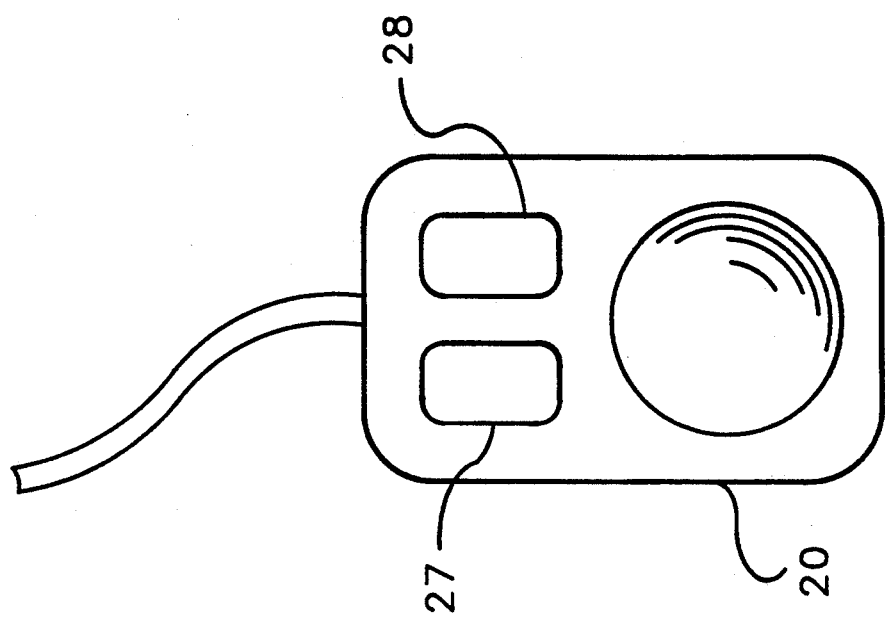
FIG. 7 shows a top view of the mouse shown in FIG. 6.
Figure 6:
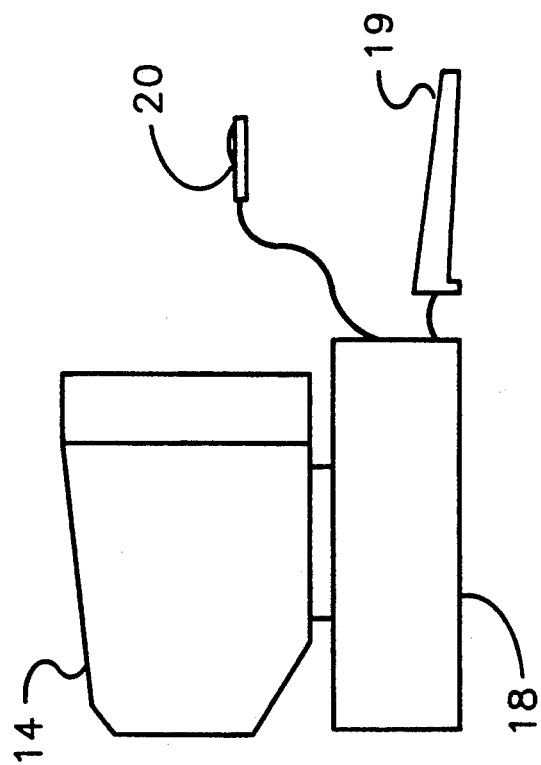
FIG. 6 shows a computer, monitor, keyboard and mouse in accordance with the preferred embodiment of the present invention.

FIG. 6 shows a computer 18 on which INSTRUCTION objects may be run. Also shown are a monitor 14, a mouse 20 and a keyboard 19. FIG. 7 shows mouse 20 to include a button 27 and a button 28.

Figure 8:
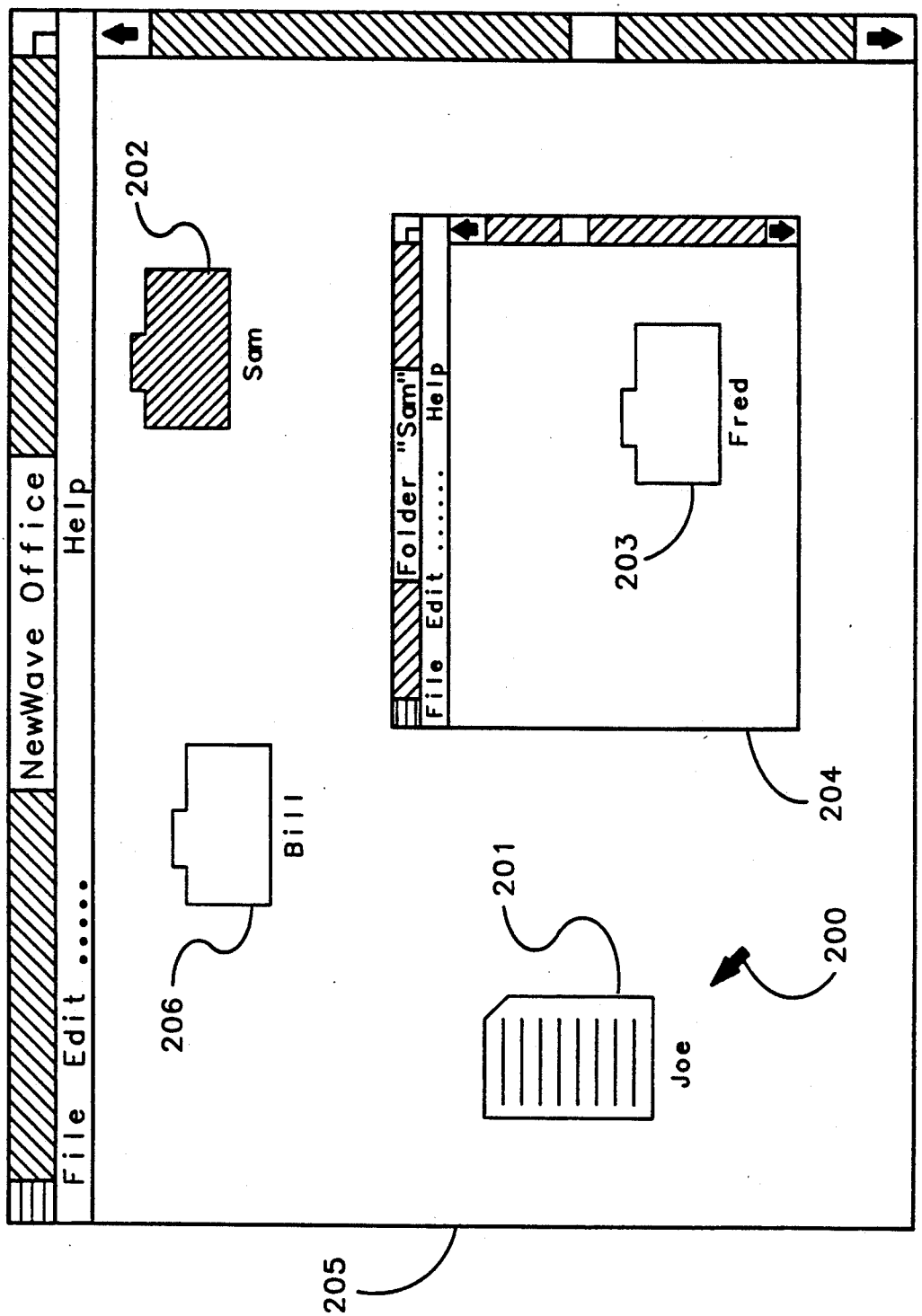
FIG. 8 shows data flow within the compiler shown in FIG. 5.

In FIG. 8 is shown data flow between independent parser 122 and dependent parsers of which dependent parser 123 and dependent parser 124 are shown. In order to focus the discussion on the relationship between parsers, calls to expression parser 166 by scanner 122a are not taken into account in the discussion of FIG. 8.

Also, CBT parser 125 and a dependent scanner 125a for CBT parser 125 are shown. When the CBT flag is "on" precedence for parsing commands is a class dependent parser with focus, then CBT parser and finally class independent parser 122 as stated above. In the following discussion, for simplicity of explanation, it is assumed that the CBT flag is off.

When independent parser 122 is ready for a token, independent parser 122 calls a scanner routine 122a. Scanner 122a checks if there is a focus on an application. If there is not a focus on an application, scanner 122a calls input stream processor 164 which returns to scanner 122a a token. Scanner 122a returns the token to independent parser 122a.

If there is a focus on an application, the dependent parser for the application has precedence and is called. For instance, when focus is on the application for parser 123, parser 123 calls scanner 122a through a dependent scanner 123a. Scanner 122a checks its state and determines that it is being called by a dependent parser, so it does nor recursively call another dependent parser. Scanner 122a calls input stream processor 164 which returns to scanner 122a a token. Scanner 122a returns the token to dependent parser 123 through dependent scanner 123a. Although the present implementation of the present invention includes dependent scanner 123a, in other implementations dependent scanner 123a may be eliminated and parser 123 may call scanner 122a directly.

Dependent parser 123 will continue to request tokens through dependent scanner 123a as long as dependent parser 123 is able to parse the tokens it receives. With these tokens dependent parser will call semantic routines which will generate class dependent external commands embedded in pcode. When dependent parser 123 is unable to parse a token it receives, dependent parser will return to scanner 122a an error. Scanner 122a then calls input stream processor 164 and receives from input stream processor 164 the token which dependent parser 123 was unable to parse. This token is returned to independent parser 122. Independent parser 122 parses the token and calls semantic routines to generate pcode for execution by agent engine 108. The next time independent parser 122 requests a token from scanner 122a, scanner 122a will again call dependent parser 123 until there is a FOCUS OFF command or until there is a focus on another application.

When the focus is on the application for dependent parser 124, scanner 122a will call dependent parser 124. Dependent parser 124 calls a dependent scanner 124a and operates similarly to dependent parser 123.

Save file buffer 171, shown in FIG. 5, receives pcode from class independent parser 122 and from expression parser 166, and receives external command forms embedded in pcode from class dependent parsers. Save file buffer 171 stores this information in a temporary file 176. Second pass routines 174 takes the pcode and external command forms stored in temporary file 176 and performs housekeeping, e.g., fixes addresses etc., in order to generate pcode file 121.

Figure 9:
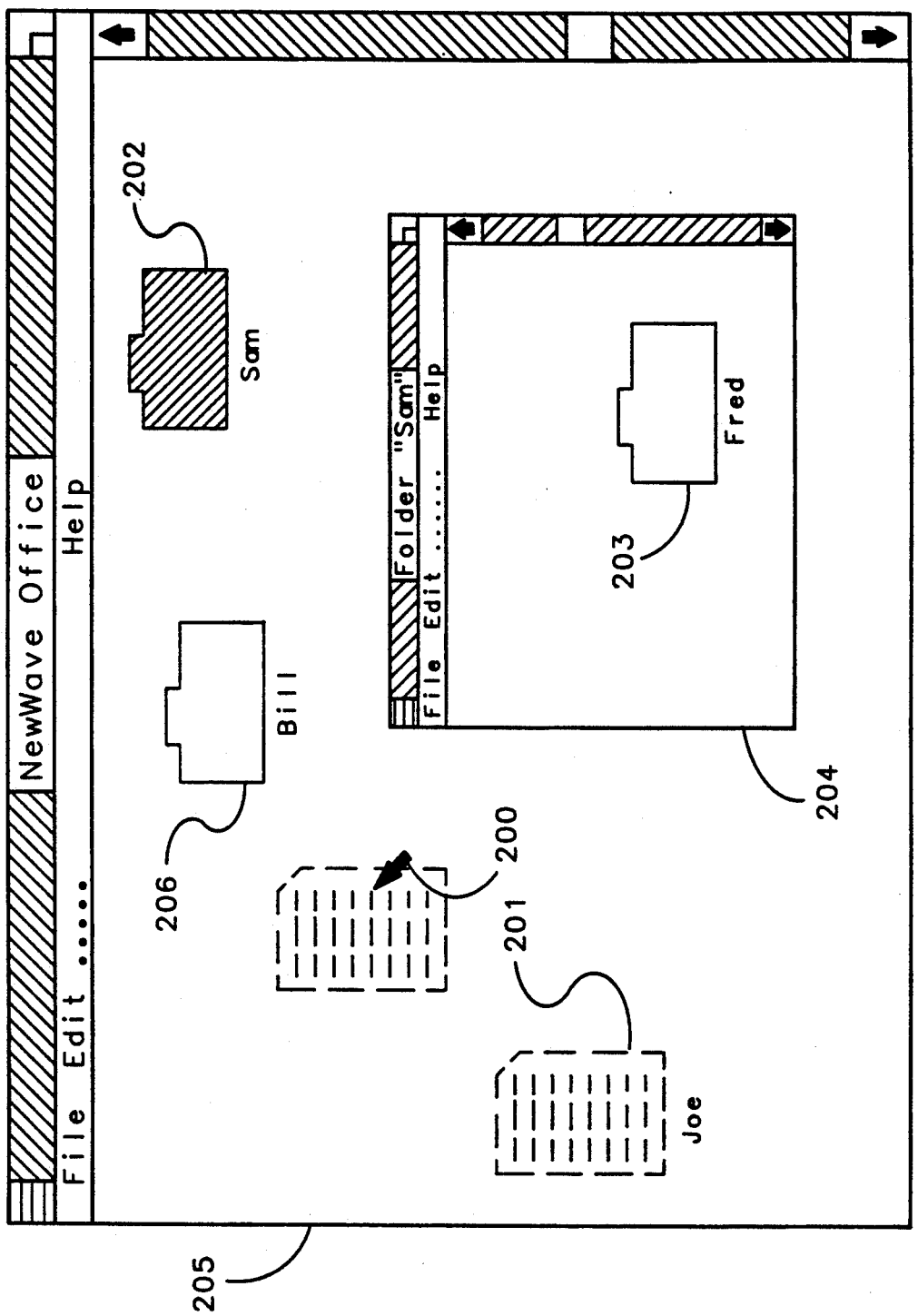
Figure 9B:
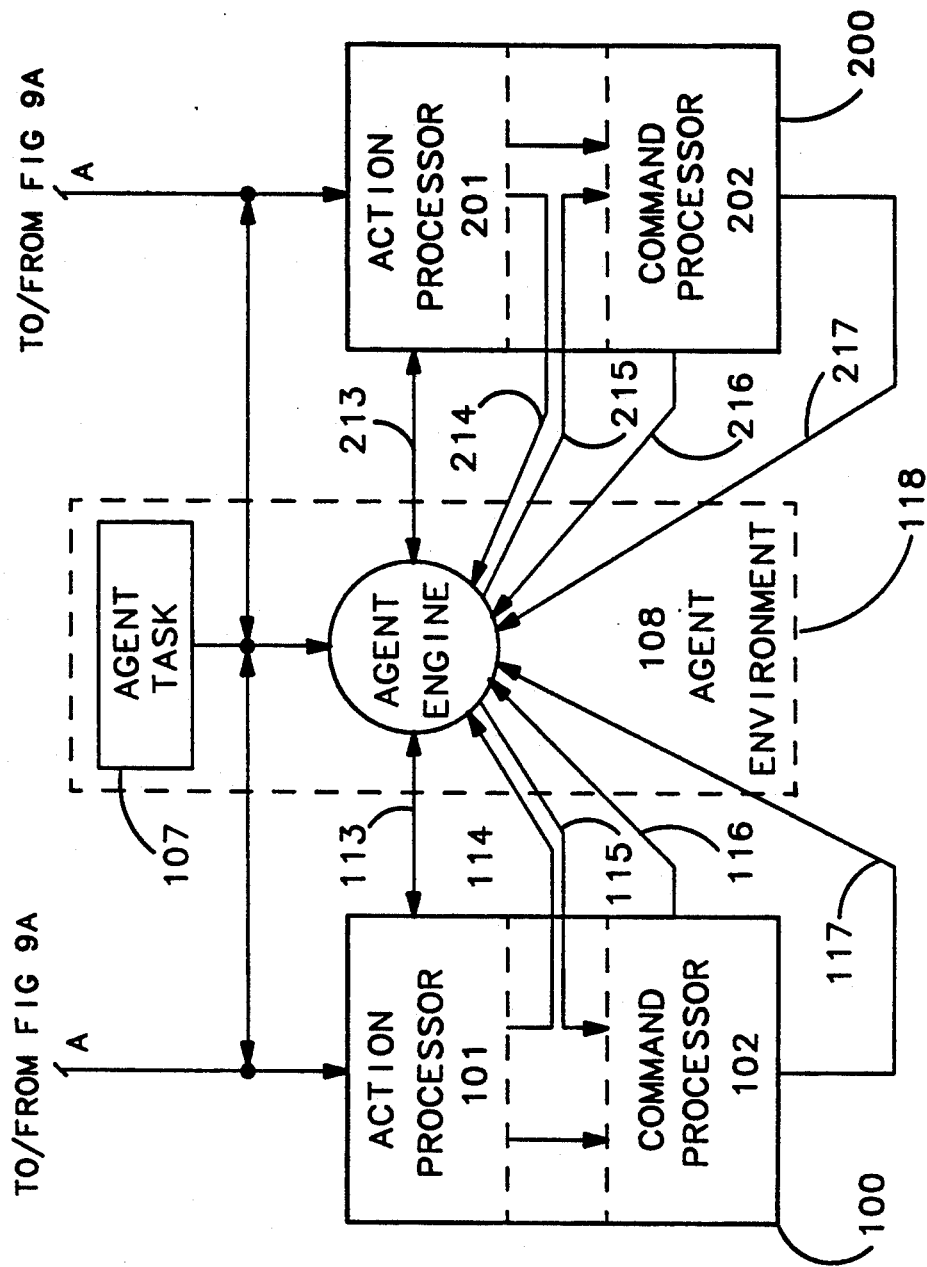

In FIGS. 9 and 9A–9B application 100 are shown to be included in, for example, an object "NewWave Office". A window 300 is the user interface for object "NewWave Office" For the purpose of instructing a user into how to use object "NewWave Office" an INSTRUCTION application 200 runs simultaneously to application 100. INSTRUCTION application 200 is included within an INSTRUCTION object. IN- STRUCTION application 200 is designed similar to other applications on the system. INSTRUCTION application 200 has an action processor 201 and a command processor 202 as shown.

Agent engine 108 interacts with INSTRUCTION application 200 as with other applications on the system. For instance agent engine 108 interacts with action processor 201 through a data channel 213 for the purpose of interrogation. Agent engine 108 interacts between action processor 201 and command processor 202 through a data channel 214 for the purpose of monitoring the activities of application 200. Agent engine 108 interacts with command processor 202 through a data channel 215 for the purpose of having commands executed by INSTRUCTION application 200. Agent engine 108 interacts with command processor 202 through a data channel 216 for the purpose of handling errors in the processing of a command within INSTRUCTION application 200. Agent engine 108 interacts with command processor 202 through a data channel 217 for the purpose of recording execution of INSTRUCTION application 200 and receiving notification of the completion of a command.

INSTRUCTION application 200 interacts with a user concurrent with the execution of application 100, for instance by displaying dialog boxes such as a window 302. INSTRUCTION application 200 also may communicate by use of other means such as voice.

Figure 10:
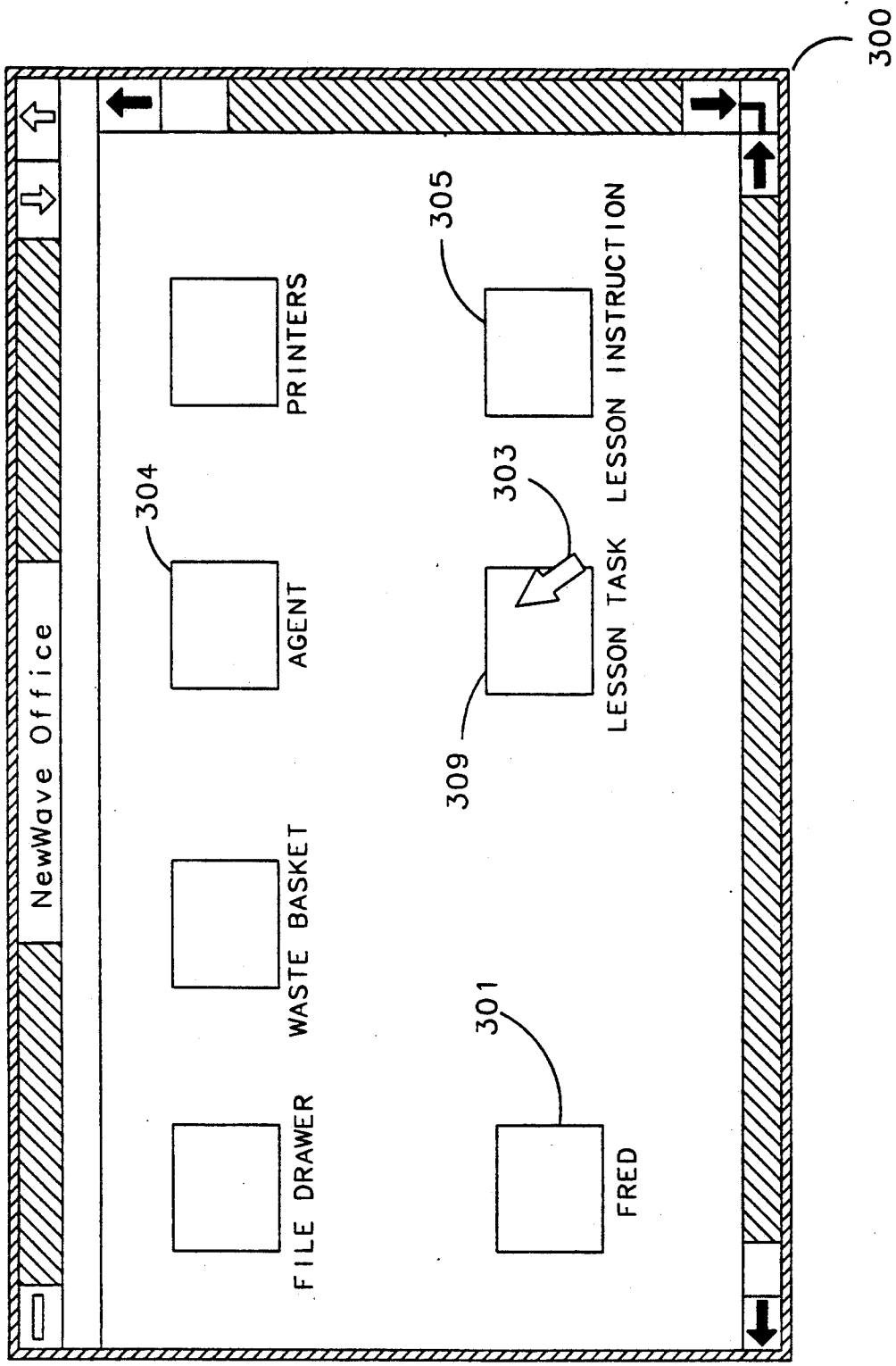
FIGS. 10-17 show what is displayed on the monitor shown in FIG. 6, as a result of the execution of a task by the system shown in FIG. 9.

FIGS. 10-17 illustrate a brief CBT session. In the session a user is instructed on how to open a folder "Fred" represented by an icon 301, shown in FIG. 10. Also shown in FIG. 10 is an icon 304 which represents agent engine 108. An icon 309 represents an object "Lesson Task" which includes the compiled pcode version of the task language file, shown in Table 1 below. The compiled pcode version of the task language file is run by agent engine 108. If object Lesson Task is opened before compilation, the source code for the pcode version of the task language file may be edited.

An icon 305, represents an object called "Lesson Instruction", which includes data called conversational data, and INSTRUCTION application 200 which contains library routines which display the data to a user. Object "Lesson Instruction" displays the data when instructed to do so by agent engine 108. A cursor 303 controlled by mouse 20 is shown pointing to icon 309.

Figure 11:
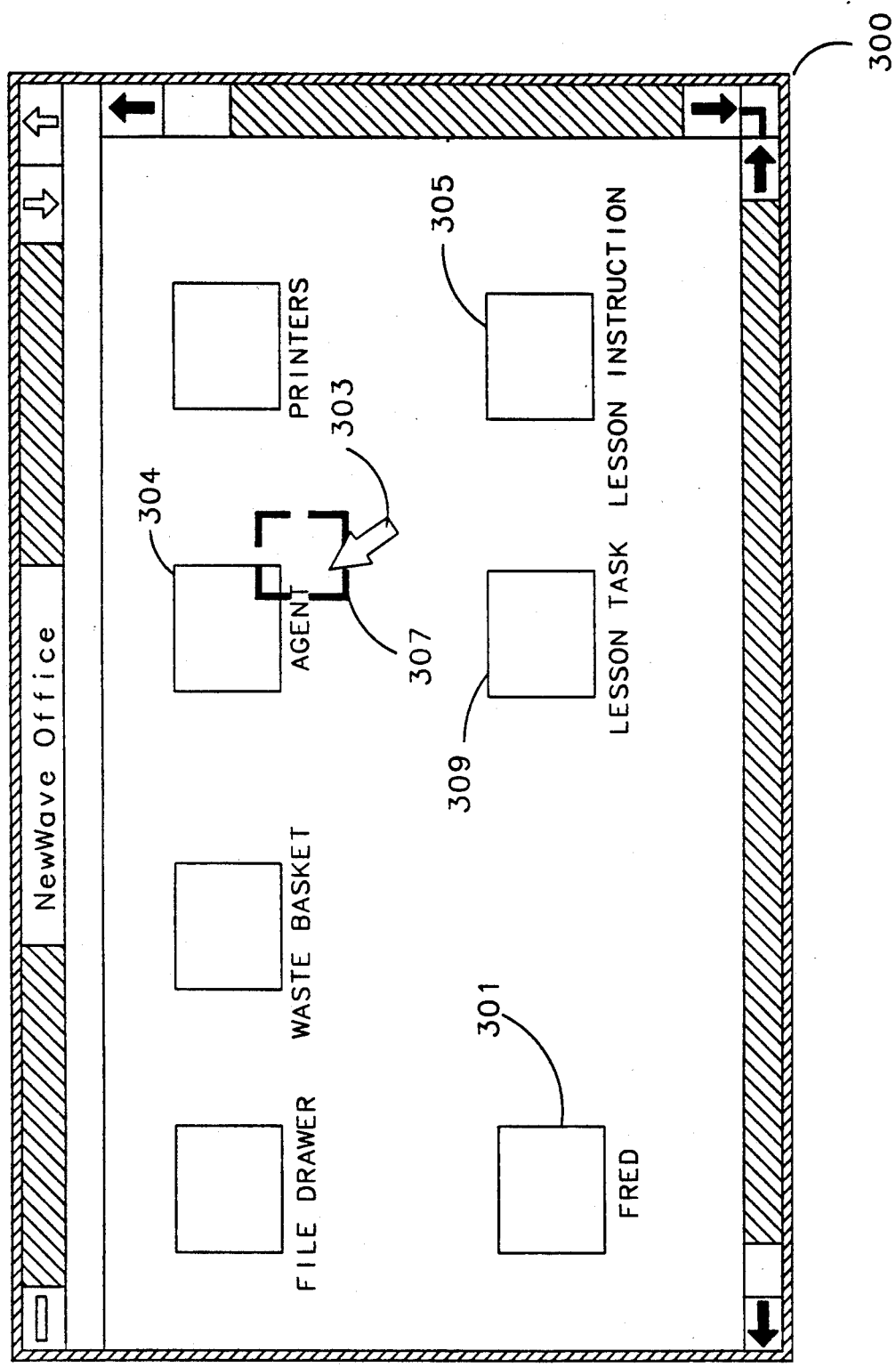
Figure 12:
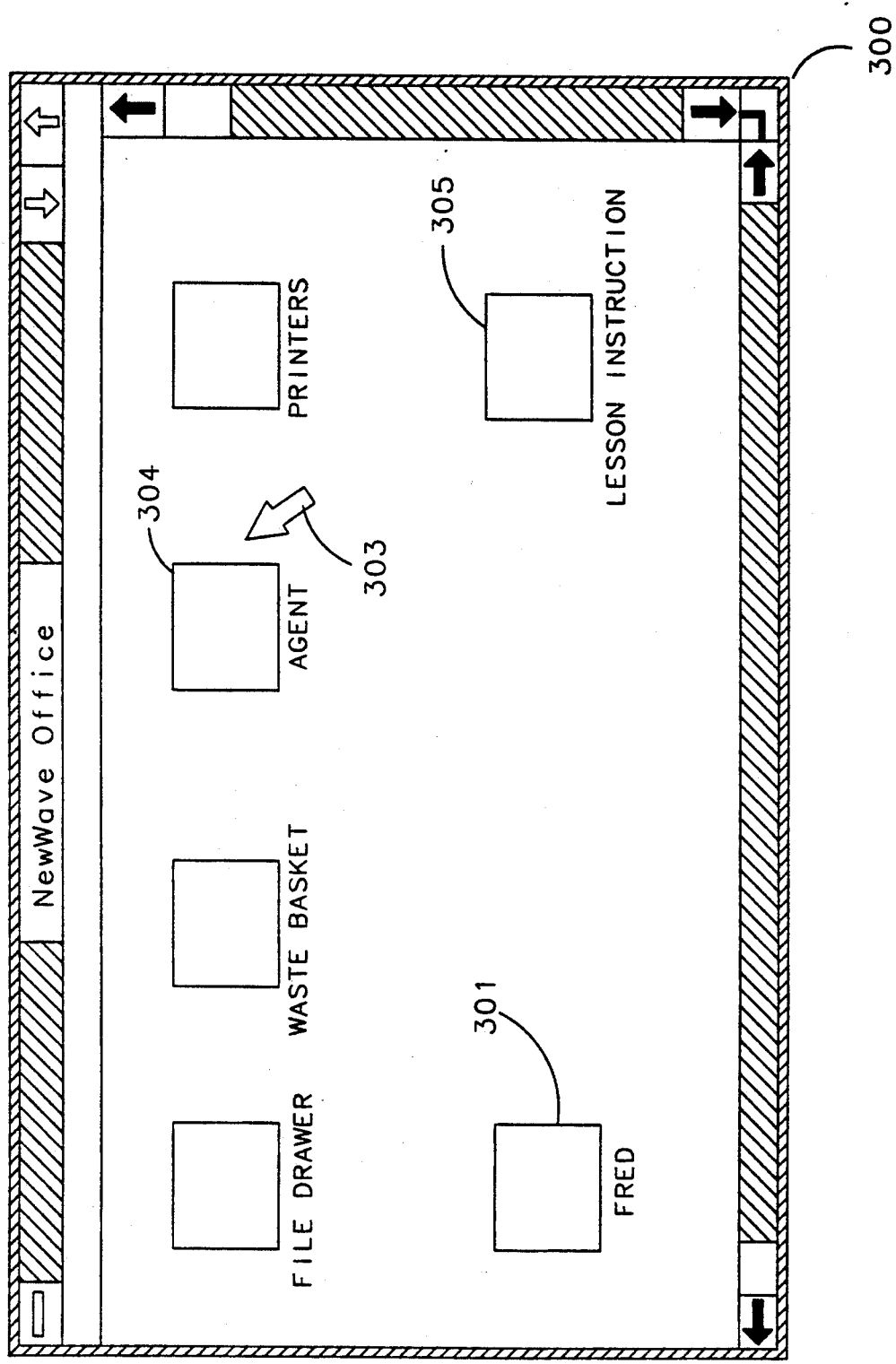

With the cursor 303 over icon 309, a user may select object "Lesson Task" by pressing button 27. At this point, icon 30 will be highlighted, as shown in FIG. 11. A shadow 307 of Icon 309 will follow cursor 303. When shadow 307 is placed over icon 305 and button 27 is released icon 309 will disappear from window 300, as shown in FIG. 12 and agent engine 108 will begin to run the task language program included in object "Lesson Task". An example of source for the task language program included in Lesson Task is given in Table 1 below:

TABLE 1

```
 1  task
 2  cbt on
 3  OPEN# = 1
 4  SELECT# = 211
 5  focus on office "NewWave Office"
 6  select instruction "Lesson Instruction"
 7  open
 8  focus on instruction "Lesson Instruction"
 9  show_window 1
10  on command do process_button
11  button_flag# = 0
```

TABLE 1-continued

```
12  set command on
13  while button_flag# = 0
14    wait
15  endwhile
16  set command off
17  hide_window 1
18  show_window 2
19  on command do process_open
20  open_flag# = 0
21  set command on
22  while open_flag# = 0
23    wait
24  endwhile
25  set command off
26  hide_window 2
27  show_window 3
28  on command do process_button
29  button_flag# = 0
30  set command on
31  while button_flag# = 0
32    wait
33  endwhile
34  set command off
35  hide_window 3
36  end task
37
38  procedure process_button
39    if sys_cmdclass( ) = "INSTRUCTION"
40      button_flag# = 1
41    endif
42    ignore
43  endproc
44
45  procedure process_open
46    if sys_cmdclass( ) = "INSTRUCTION"
47      do demo
48      open_flag# = 1
49      ignore
50    else
51      cmd# = sys_command( )
52      if cmd# = SELECT#
53        class# = sys_commandparm(1,0)
54        title# = sys_commandparm(1,len(class#))
55        execute
56      else
57        if cmd# = OPEN# and class# = "FOLDER" and
             title# = "Fred"
58          open_flag# = 1
59          execute
60        else
61          ignore
62        endif
63      endif
64    endif
65  endproc
66
67
68  procedure demo
69    focus on office "NewWave Office"
70    object_region# = where_is("FOLDER", "Fred")
71    point to center (object_region#)
72    double_click left button
73    pause 5
74  endproc
```

The task language in Table 1 is compiled by task language compiler 120, using class independent parser 122, a class dependent parser for object "NewWave Office", a class dependent parser for object "Lesson Instruction" and a CBT parser 125. For instance the "focus" command in line 5 is parsed by class independent parser 122, the "select instruction" command in line 6 is parsed by the class dependent parser for object "NewWave Office", the command "show_window" in line 9 is parsed by the class dependent parser for object "Lesson Instruction" and the command "point to center" in line 71 is parsed by CBT parser 125.

Line 1 of the code in Table 1 contains the word "task" because the first line of every task language program contains the instruction "task". Similarly line 36 of the code in Table 1 contains the word "end task" indicating the last instruction in the task program.

Figure 13:
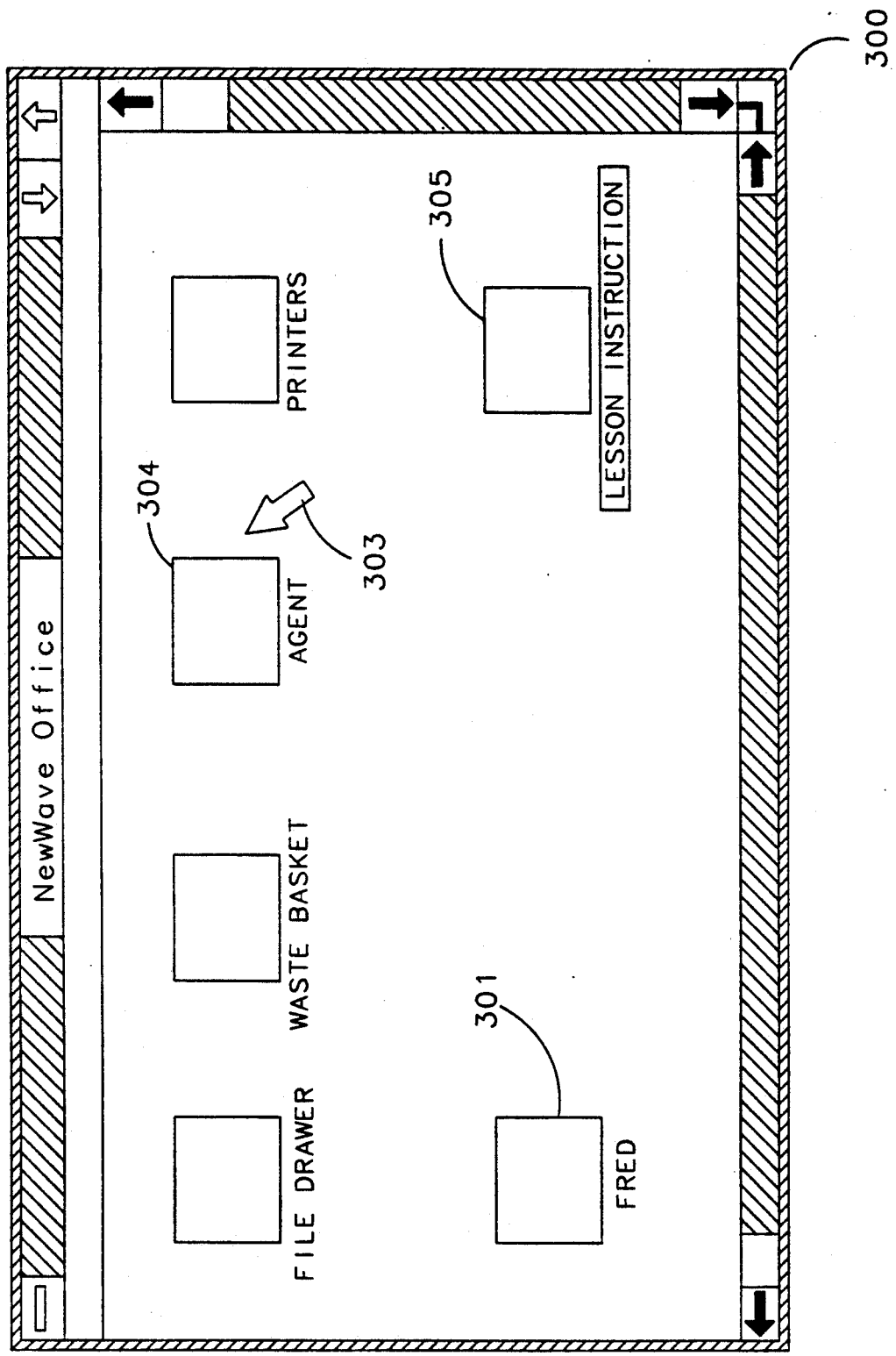

The instruction in line 2 turns the CBT compiler flag "on". The instructions in lines 3 and 4 set variables. The instruction in line 5 places the focus on object "New-Wave Office". The instructions in lines 6 and 7 will be sent from agent engine 108 to object "NewWave Office". These instructions when executed by object "NewWave Office" will cause the object "Lesson Instruction" to be selected and opened. When object Lesson Instruction is opened, it runs INSTRUCTION application 200. The selection of "Lesson Instruction" is indicated by icon 305 being highlighted as shown in FIG. 13.

Figure 14:
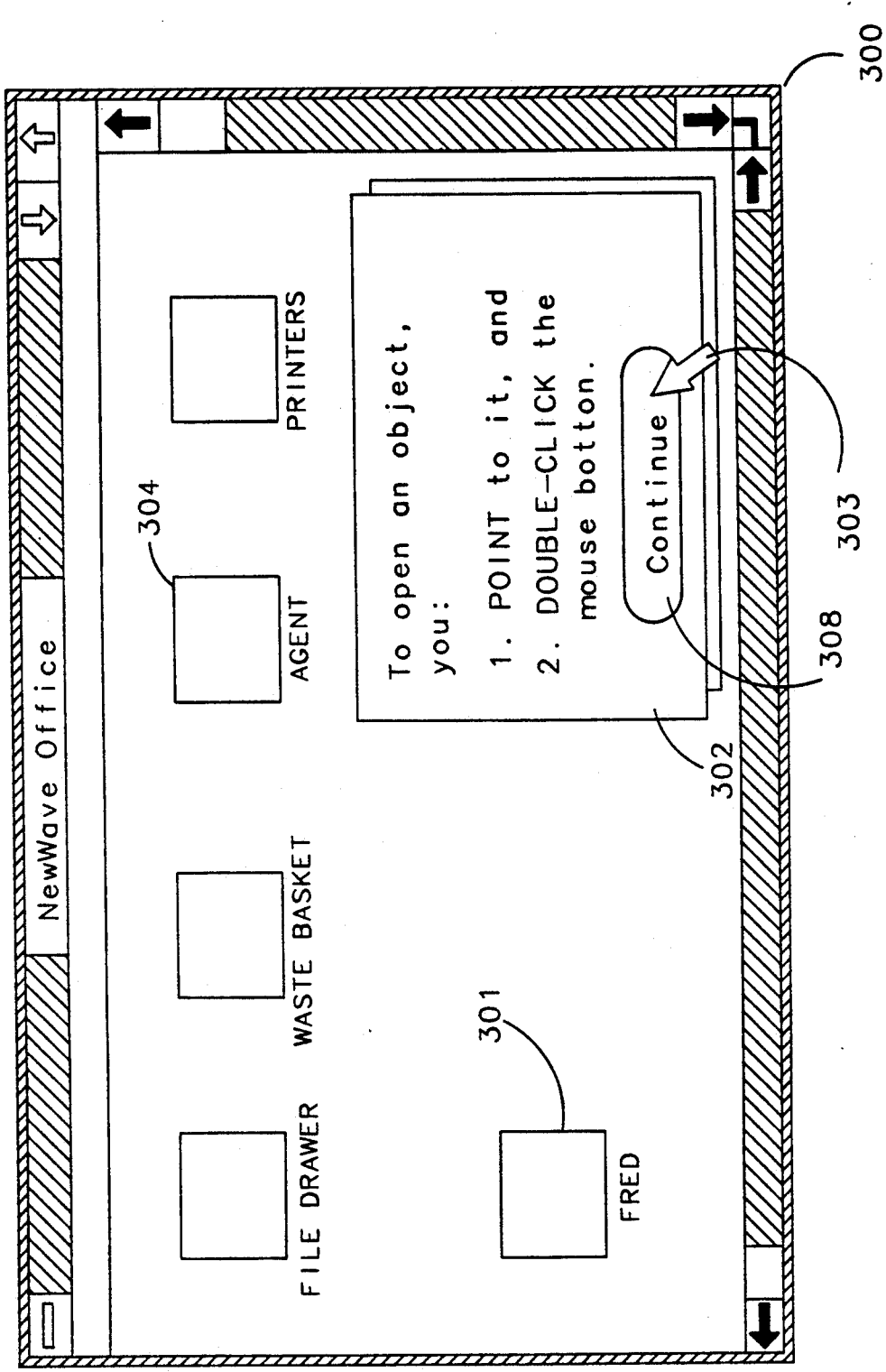

The instruction in line 8 places the focus on the object "Lesson Instruction". The instruction in line 9, when executed by agent 108, will be sent by agent 108 to object "Lesson Instruction". When executed by object "Lesson Instruction" the instruction will cause window 302 to be opened on top of window 300, as shown in FIG. 14. Window 302 instructs the user as to how to open an object. When the user is done reading window 302, he places cursor 303 over a button 308, using mouse 20, and clicks button 27. Essentially, then agent engine 108 waits for the user to select button 308, which is labeled "Continue". Agent engine 108 will cause every other command to be ignored. Agent engine 108 is able to to this by monitoring the applications executed by other running objects, and intercepting commands before they are executed. The code required for this is described below.

The instructions in lines 10-14 are executed by agent engine 108 while the user reads window 302. The instruction in line 10 defines a monitoring procedure. In line 11, the variable "button_flag#" is cleared to "0". In 12 the instruction "set command on" turns monitoring on. When monitoring is turned on, the procedure "process_button" will be performed upon the user performing any command. This corresponds to any command being sent along a data path between an action processor and a command processor in an application, e.g., along data path 114 between action processor 101 and command processor 102 of application 100. This is called a command trap. The command trap is able to be generated because agent engine 108 is able to monitor "NewWave Office" application 100 and INSTRUCTION application 200. When agent engine produces a command trap, commands sent from action processor 101 to command processor 102, and commands sent from action processor 201 to command processor 202 are intercepted by agent engine 108. Thus both object "NewWave Office" and "Lesson 1" are monitored by agent engine 108. Semantic commands from both objects are intercepted before execution and result in a command trap.

The procedure "process_button" is shown in lines 38-43 of Table 1. The function "sys_cmdclass()" returns the class string of the object who received the command from the user. In line 39, the object is INSTRUCTION application 200, that is, if the procedure process_button is called because the user has placed cursor 303 over button 308 and clicked button 27, then function "sys_cmdclass()" will return the string "INSTRUCTION" and the variable "button_flag#" shall be set to "1" in line 40. On the other hand, if any other object receives a command from the user—e.g., if the user places cursor 303 in window 300 and clicks button 27—the class string of the object shall be returned and shall not be equal to "INSTRUCTION" and the variable "button_flag#" will not be set to "1".

In line 42, the "ignore" command indicates that regardless of which object (i.e., whether object "New-Wave Office" or "Lesson1") returned the command from the user, the command itself is to be ignored. That is whether the command came from "NewWave Office" application 100 or INSTRUCTION application 200, the command is not returned to command processor 102 or command processor 202 for further processing. Instead, a NULL command is returned by setting the command to API_NO_CMD.

After turning monitoring on, in line 12, agent engine executes the instruction in line 13 and enters a while loop (instructions 13-15) waiting for a user to select button 308 with cursor 303. While in this loop, when any command is generated in an application, procedure "process_button" is run. Upon completion of procedure "process_button", if button_flag#=0, agent engine remains in the loop defined by the instructions in lines 13-15. If button_flag#=1, agent engine 108 continues execution of the program with the instruction in line 16.

Figure 15:
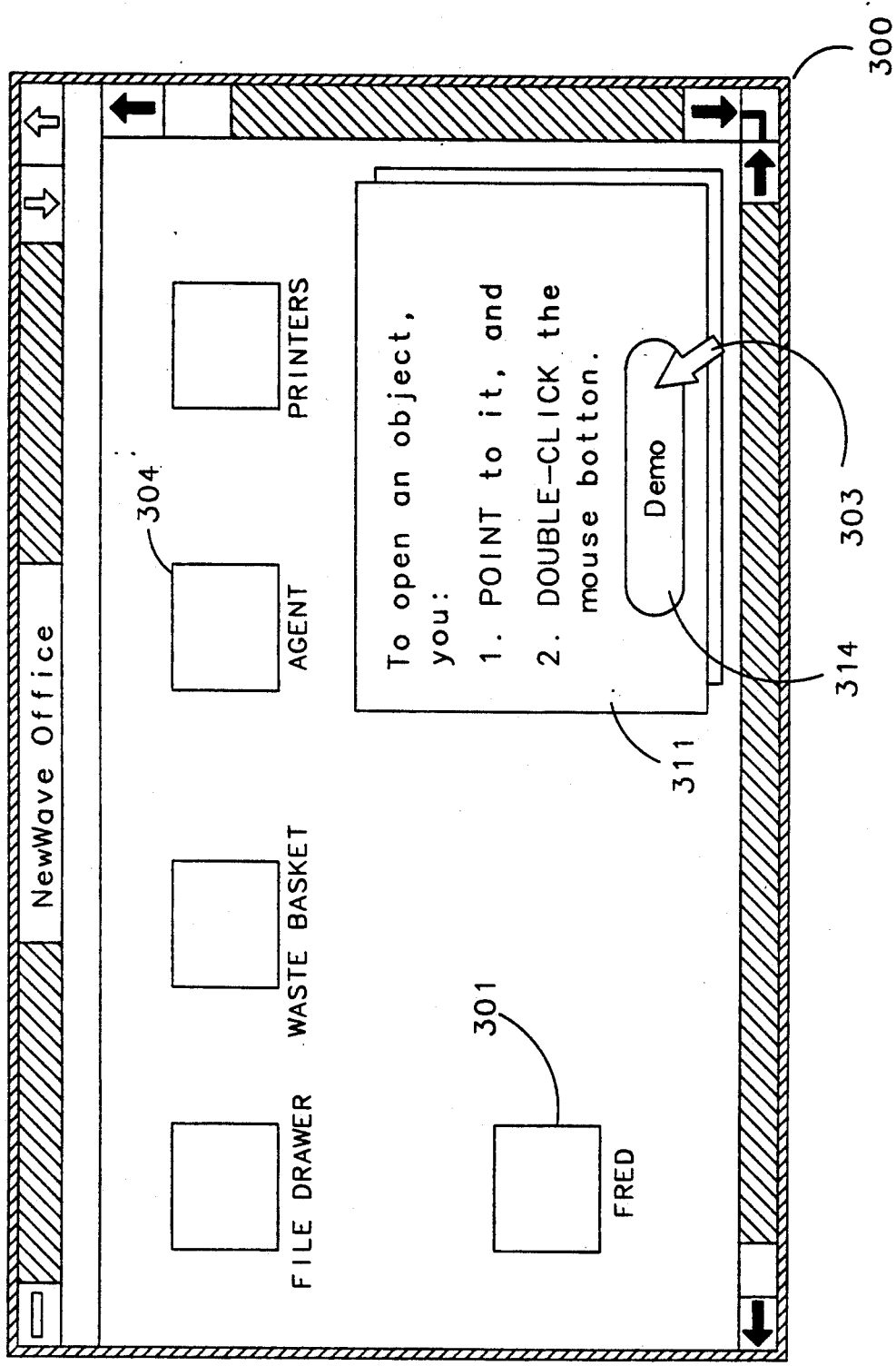

In line 16, monitoring is turned "off". The instructions in lines 17 and 18 are sent by agent engine 108 to object "Lesson Instruction" for execution by INSTRUCTION application 200. The instructions when executed cause INSTRUCTION application 200 to remove window 302 from display 14 and a to display window 311 as shown in FIG. 15. The instruction in line 19, executed by agent engine 108, redefines the monitor procedure to be the procedure "process_open".

In line 20, the variable "open_flag#" is set to "0". In line 21 the instruction "set command on" turns the monitoring "on" resulting in agent engine 108 intercepting commands before they are executed by any object running on the system.

The instructions in lines 22-24, instruct agent engine 108 to wait until variable "open_flag" is set to "1" in procedure "process_open" before proceeding with execution of the program. When a command is generated in an application, as a result of user action, procedure "process_open" is run. Upon completion, if open_flag#=0, agent engine remains in the loop defined by the instructions in lines 22-24. If open_flag#=1, agent engine 108 continues execution of the program with the instruction in line 25.

The procedure "process_open" is given in lines 45-65. If, in line 46 function "sys_cmdclass()" returns "INSTRUCTION", this indicates that it was INSTRUCTION application 200 that was attempting to execute a command. This means that the User has selected button 314 requesting a demonstration. Therefore, in line 47, the procedure "demo" is called. In line 48, variable "open_flag#" is set to 1. In line 49, agent engine 108, is instructed to ignore the command that is being monitored.

The procedure "demo" given in lines 68-74 shows a user how folder "Fred" may be opened. The instruction in line 68 places the focus on object "NewWave Office". The interrogation function "where_is('FOLDER", "Fred")" asks the object "NewWave Office" where in its display, i.e., window 300, is the FOLDER Fred. When agent engine 108 executes this instruction, agent engine sends an API_INTER- ROGATE_MSG message to object "NewWave Office" which responds with coordinates of the location of FOLDER Fred in window 300.

Figure 16:
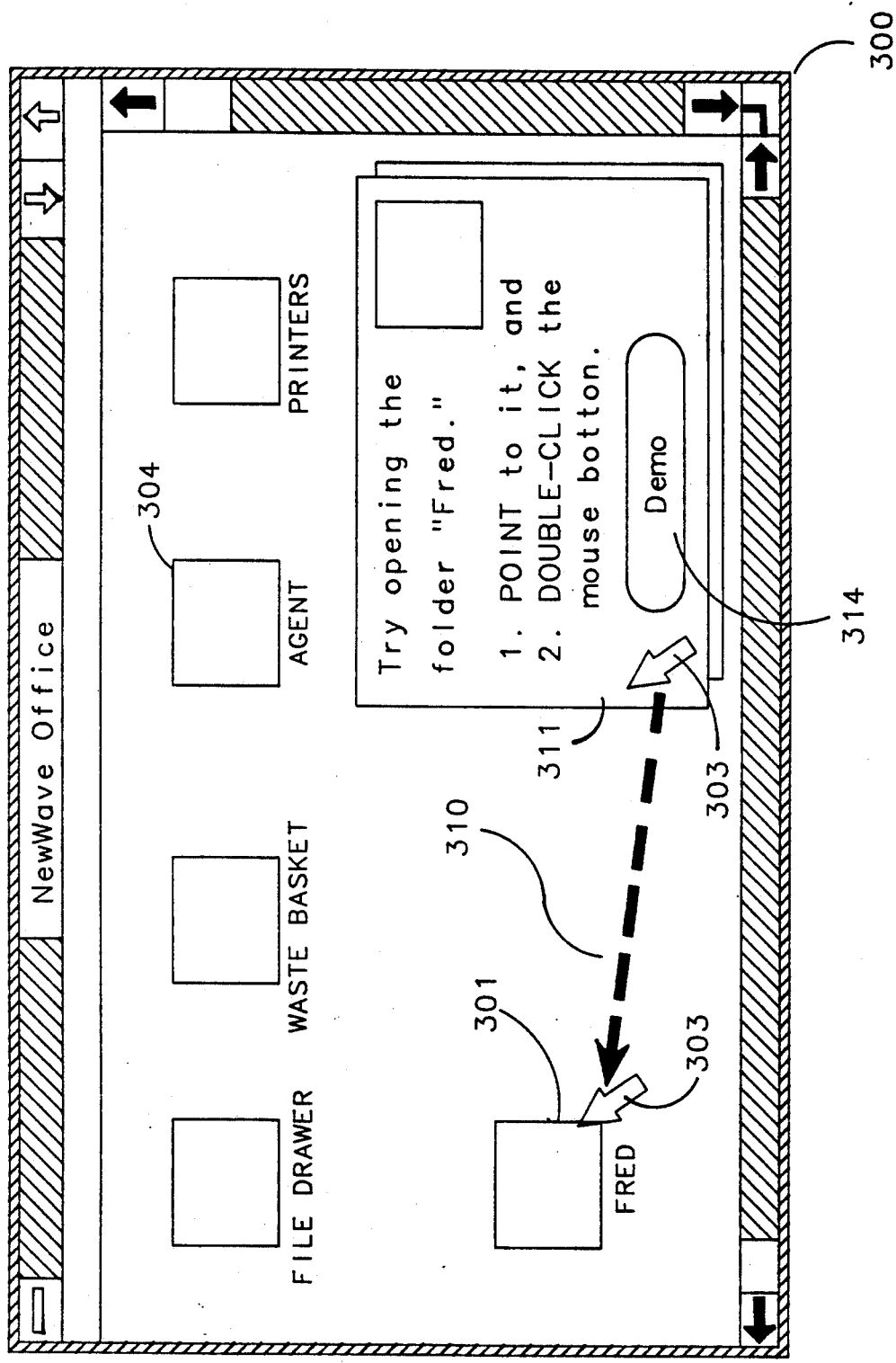

In the instruction in line 70, variable "object_region#" is set to value returned by the function "where_is("FOLDER", "Fred")". The instructions in line 71 and 72 produce a sequence of user action level messages to be sent, through user action interface, to object "NewWave Office" for execution. The instruction in line 71 causes cursor 303 to move to point to the center of folder Fred, as shown in FIG. 16. In FIG. 16 the motion of cursor 303 is represented by cursor 303 being shown at the starting point and the ending point of a path of movement 310. In line 72, a user action equivalent to a double click on button 20 of mouse 27 is sent to object "NewWave Office" to be processed. In line 73, a five second pause allows a user a chance to reflect over what he has seen.

In general, there are three types of interrogation functions. The function "where_is()" has as parameters the identification of an object class and title, and asks for the rectangular regions within the display on monitor 14 of an icon representing the object. The function "whats_at()" has as a parameter a point on the display and asks for the identity of any object that is represented by an icon at that point. The function "status()" has as a parameter the identification of an object and asks for the status of the object, e.g., does the object have focus, or is there an open window for the object. Instructions for each of these functions, when executed by agent engine 108, result in an API_INTERROGATE_MSG message being sent from agent engine 108 requesting the information from the object which has focus.

The use of interrogation functions allows great flexibility for demo programs. Using an interrogation function a demo program is able to locate an object, determine what objects reside at particular locations and to determine the status of an object. Using these interrogation functions allows a demo program to execute a demo even though the demo program does not initially know the location, identity and/or status of objects used in the demo.

If a user attempts to open folder Fred rather than receive a demo, the instructions in lines 51–64 of "process_open" will cause agent engine 108 to monitor commands generated by "NewWave Office" application 100 before allowing execution of the commands. A command generated by the user is intercepted when it is sent from action processor 101 to command processor 102.

Figure 17:
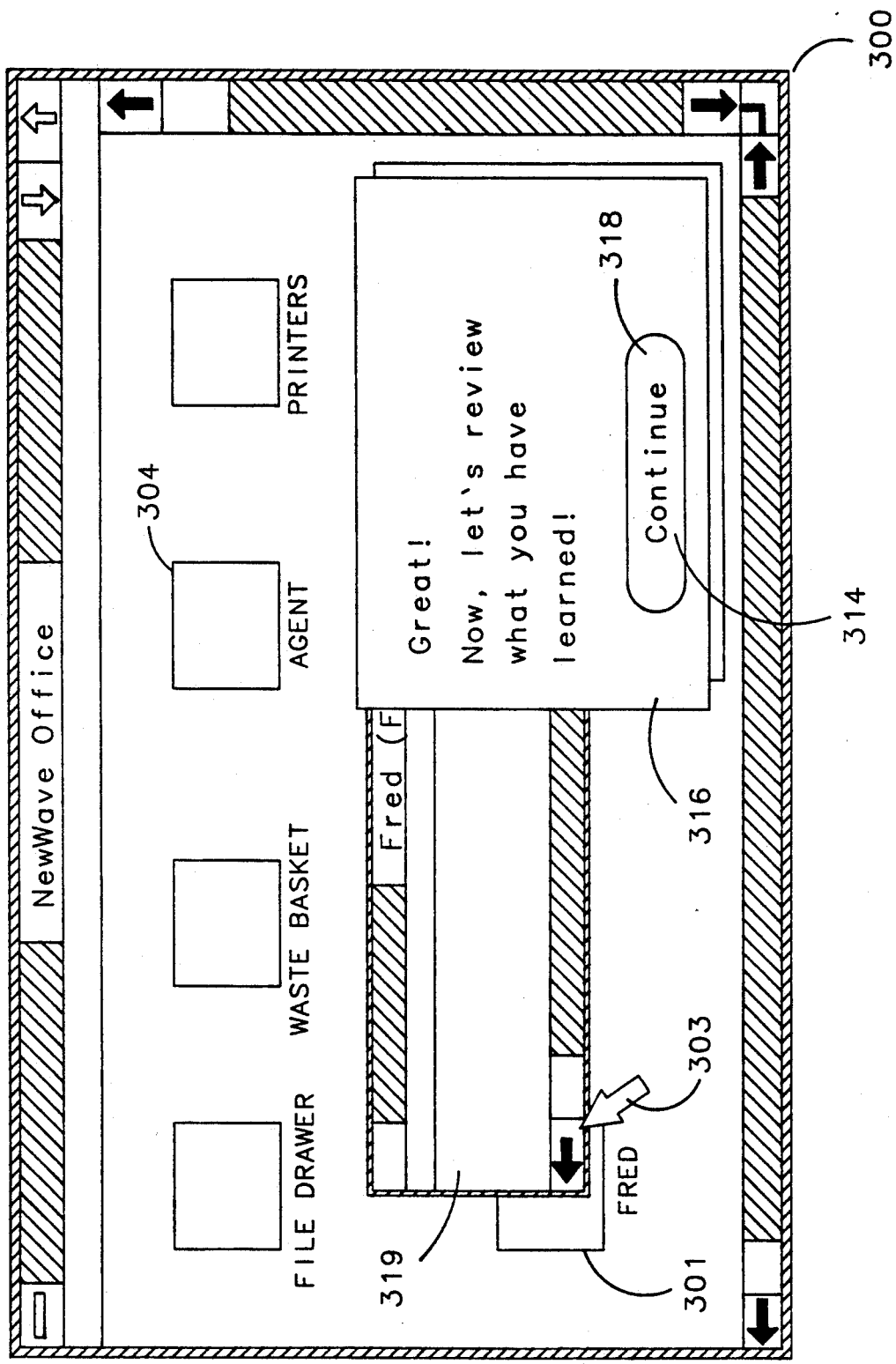

The instructions in lines 51–64 allow a user to open folder Fred in a number of ways. For instance, the user may place cursor 303 over folder Fred and double click button 27 or the user may select folder Fred and select the command "Open" from a pull down menu. Regardless of the way the user chooses to open folder "Fred", two commands must occur in sequence. First, the select command must be returned to command processor 102 with the user having selected folder "Fred". When this occurs, class# is assigned the value "FOLDER" in line 53, title# is assigned "FRED" in line 54, and the select command is executed in line 55. Second, an open command must be returned to command processor 102 for execution. When an open command is returned and if class# =FOLDER and title#=FRED, then the open_flag# will be set to 1 in line 58 and the open command will be executed in line 59. All other commands are ignored by agent engine 108. When the user is successful in opening folder "Fred", window 319 will appear as shown in FIG. 17.

In line 25, monitoring is turned off. The instructions in lines 26 and 27 are sent by agent engine 108 to object "Lesson Instruction" for execution. Upon execution, window 311 is removed from display 14 and a window 316 appears as shown in FIG. 17. The instruction in line 28 redefines the monitor procedure to be procedure "process_button" so that procedure "process_button" is performed upon the user performing any command, but only when monitoring is on.

In line 29, the variable "button_flag#" is set to "0". In line 30 the instruction "set command on" results in monitoring being turned on so that a command trap is produced at the generation of a command in any application.

Agent 108 loops through the instructions in lines 31-33, as long as button_flag# remains at 0. At instruction 32, agent engine waits for a command to be intercepted from any application. When a command is intercepted from INSTRUCTION application 200, button_flag# is set to 0 and agent engine 108 escapes the loop and proceeds with the execution of the instruction in line 34.

In line 34, monitoring is turned off. The instruction in line 35 is sent by agent engine 108 to object "Lesson Instruction" for execution. Upon execution, window 316 is removed from display 14.

Appendix A contains an Introduction to API 130 (Programmer's Guide Chapter 4).

Appendix B contains guidelines for developing agent task language
(Agent Task Language Guidelines).

Appendix C contains a description of Task Language Internals.

Appendix D contains description of API_INTERROGATE_MSG.

Appendix E contains a paper entitled "Extensible Agent Task Language".

Appendix F contains a Hewlett Packard internal document entitled: "Tools and Strategies for Implementing Computer-Based Training in the New Wave."

Appendix G contains an article to appear in the HP Journal entitled "Computer-Based Training Facility ("Cousteau")".

We claim:

1. A computing system comprising:

a monitor, a first application process for interacting with a user to facilitate the user accomplishing a task, the first application process displaying on the monitor information pertaining to the task, the first application process being responsive to first syntactic actions taken by the user and the first application process including first action processor means for receiving messages which indicate the syntactic actions taken by the user and for generating first semantic commands based on the first syntactic actions, and first command processor means for receiving the first semantic commands from the first action processor and for executing the first semantic commands;

an INSTRUCTION process, the INSTRUCTION process being responsive to second syntactic actions taken by the user, and the INSTRUCTION process displaying information on the monitor, the information being directed to training the user in operating the first application process; and, an agent process, coupled to the first application process and to the INSTRUCTION process, for sending second semantic commands to the INSTRUCTION process to indicate to the INSTRUCTION process which information to display on the monitor and for intercepting the first semantic commands sent from the first action processor means to the first command processor means.

2. A computing system as in claim 1 wherein the INSTRUCTION process includes:

INSTRUCTION action processor means for receiving messages which indicate the second syntactic actions taken by the user and for generating third semantic commands based on the second syntactic actions, and INSTRUCTION command processor means for receiving the third semantic commands from the INSTRUCTION action processor means and from the agent process and for executing the third semantic commands.

3. In a computing system having a monitor, an application process, an INSTRUCTION process and an agent process, a method for providing computer based training to a user on how to use the application process, the method comprising the steps of:

(a) generating information about the application process, the information pertaining to training the user in use of the application process;

(b) running the application process;

(c) sending from the agent process to the INSTRUCTION process first semantic commands which direct the INSTRUCTION process to display the information about the application process generated in step (a);

(d) displaying, by the INSTRUCTION process, the information about the application process; and, (e) intercepting, by the agent process, second semantic commands generated by the application process before the application process executes the second semantic commands.

4. A method as in claim 3 additionally comprising the step of:

(f) sending from the agent process to the application process third semantic commands to be executed by the application process.

5. A method as in claim 3 additionally comprising the step of:

(f) intercepting, by the agent process, third semantic commands generated by the INSTRUCTION process before the INSTRUCTION process executes the third semantic commands.

6. In a computing system having a monitor, and an agent process, a method for providing a demonstration, the method comprising the steps of:

(a) sending an interrogation message from the agent process to a first process, the interrogation message requesting the first process to send to the agent process information about a graphical interface element displayed in a window of the first process;

(b) accessing, by the first process, the information about the graphical interface element requested in step (a);

(c) sending, from the first process to the agent process, the information about the graphical interface element accessed in step (b); and, (d) performing the demonstration by the agent process, wherein the demonstration includes the substep of manipulating the graphical interface element displayed in the window of the first process.

7. A method as in claim 6 wherein the interrogation message includes an identity of the graphical interface element and the information about the graphical interface element includes a location of the graphical interface element within the window.

8. A method as in claim 6 wherein the interrogation message includes an identity of the graphical interface element and the information about the graphical interface element includes status information about a second process represented by the graphical interface element.

9. A method as in claim 6 wherein the interrogation message includes a location of the graphical interface element and the information about the graphical interface element includes an identity of the graphical interface element.

10. A method in claim 6 wherein step (d) includes the substeps:

(d.1) sending messages from the agent process to an INSTRUCTION process which instruct the INSTRUCTION process to display conversational data; and, (d.2) displaying by the INSTRUCTION process the conversational data on the monitor.

* * * * *